Patented Dec. 23, 1952

2,623,031

UNITED STATES PATENT OFFICE 2,623,031

ELASTIC LINEAR COPOLYESTERS

Mark Dagenkolb Snyder, Tonawanda, N. Y., assignor to E. I. du Pont de Nemours and Company, Wilmington, Del., a corporation of Delaware No Drawing. Application March 20, 1950, Serial No. 150,812

12 Claims. (Cl. 260—45.4)

This invention relates to linear copolyesters and especially to elastomers prepared from critical mixtures of certain polyesters and copolyesters. More particularly this invention relates to elastic fibers and films prepared from such mixtures of polyesters having a very high degree of extensibility coupled with a very high rate and degree of elastic recovery, and high stick temperatures.

Most, if not all, synthetic materials, especially those that are fiber-forming and have been proposed for uses to replace rubber, have fallen far short of the properties of this unique material, especially in the rate of elastic recovery from deformation frequently referred to as "snap." Further, the synthetic elastomers have almost invariably fallen considerably short of rubber in that they are not capable of high elastic recovery, which for the purposes of this invention we are defining as of the order of 90% or better within one minute after an elongation of 100%. However, in the textile and allied fields rubber, whether natural or synthetic, possesses a number of disadvantages. For example, it cannot be used in garments without having its strands covered with such materials as cotton or rayon, because of its unpleasant and harmful effects when in contact with the skin. It possesses an unpleasant odor and is subject to deterioration under the influence of light and/or oxygen and progressively loses its strength and elasticity with the passage of time. It is, therefore, desirable to find a new material which will possess high elasticity, but it is also of great importance to develop such a material which will, in addition, possess characteristics different from and superior to those of rubber. Filaments and fibers having a high degree of extensibility and high elastic recovery after elongation and being free from the undesirable characteristics possessed by rubber should occupy a place of considerable importance in the field of textiles and the like.

Moreover, many potential uses of elastic fibers require that they be undamaged during ironing in the customary manner. Elastic fibers known up to the present, including covered rubber, are not satisfactory in this respect in that they are not heat stable at ironing temperatures. An elastic product which can be ironed would thus represent a considerable advance in the art.

An object of this invention, therefore, is to provide a synthetic material capable of being formed into filaments, film and like structures which will possess the property of high elastic recovery, and have a high stick temperature.

Another object is to provide a synthetic filament- and film-forming polymer having the high elastic recovery characteristic of rubber but which is free of the aforementioned disadvantages of rubber in the textile field.

Still another object is to provide synthetic, elastic filaments the heat stability of which is such that textile fabrics made therefrom remain undamaged when ironed in the customary manner.

The above stated and other objects will more clearly appear hereinafter.

These objects are realized by the present invention which, briefly stated, comprises copolymerizing, under melt polymerization conditions and within certain composition limits hereinafter specified, at least one acyclic dicarboxylic acid of the formula:

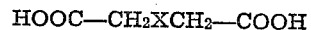

HOOC—CH$_2$XCH$_2$—COOH wherein X is a chain composed of 4 to 9 atoms, in the chain of which not more than three may be oxygen atoms and the remaining are hydrocarbon carbon atoms, any two such oxygen atoms being separated by at least two such carbon atoms, the hydrocarbon carbon atoms being saturated and containing a total of not more than three carbon atoms as side chain substituents with a symmetrical aromatic dibasic acid from the group consisting of terephthalic acid, bibenzoic acid, ethylene bis-p-oxybenzoic acid, tetramethylene bis-p-oxybenzoic acid, and 2,6-naphthalic acid and with a polymethylene glycol of the formula HO(CH$_2$)$_n$OH wherein $n$ is a whole number from 2 to 6 inclusive, and thereafter melt-blending the copolymer thus formed with an aromatic polyester, prepared by melt polymerizing a, preferably the same, symmetrical aromatic dibasic acid from the group consisting of terephthalic acid, bibenzoic acid, ethylene bis-p-oxybenzoic acid, tetramethylene bis-p-oxybenzoic acid, and 2,6-naphthalic acid and a polymethylene glycol of the formula HO(CH$_2$)$_n$OH, $n$ being a whole number from 2 to 6 inclusive. Filaments and films prepared from the resulting blend of polyesters by the conventional melt or solvent spinning or casting techniques, after orientation by cold drawing, exhibit in general, a stick temperature of at least 130° C., an elastic recovery of at least 90% within one minute after an extension of 100% and a satisfactory degree of heat-stability at ironing temperatures.

The expression "stick temperature" of the polymeric material, as used herein, is defined as the minimum temperature at which a sample of the polymer leaves a wet molten trail as it is stroked with moderate pressure across a smooth surface of a heated block of brass.

As representative acyclic dicarboxylic acids of the formula HOOC—CH₂XCH₂—COOH suitable for the purposes of this invention there may be mentioned suberic, HOOC(CH₂)₃(CH₂)₃COOH; azelaic, HOOC(CH₂)₃CH₂(CH₂)₃COOH; oxydibutyric, HOOC(CH₂)₃O(CH₂)₃COOH; sebacic, HOOC(CH₂)₃CH₂CH₂(CH₂)₃COOH; 5-oxa-1,10-decanedioic, HOOC(CH₂)₃OCH₂(CH₂)₃COOH; undecanedioic,

HOOC(CH₂)₃CH₂CH₂CH₂(CH₂)₃COOH 4-n-propyl suberic,

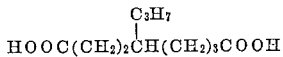

β-methyl-β'-ethyl suberic,

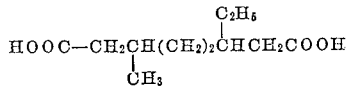

6,6-dimethyl undecane-1,11-dioic,

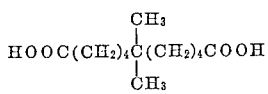

oxydivaleric,

HOOC(CH₂)₃CH₂OCH₂(CH₂)₃COOH 7-oxa-1,11-undecanedioic,

HOOC(CH₂)₃CH₂CH₂O(CH₂)₃COOH dodecanedioic,

HOOC(CH₂)₃CH₂CH₂CH₂CH₂(CH₂)₃COOH 5-oxa-1,12-dodecanedioic,

HOOC(CH₂)₃OCH₂CH₂CH₂(CH₂)₃COOH tridecanedioic,

HOOC(CH₂)₃CH₂CH₂CH₂CH₂CH₂(CH₂)₃COOH 5-oxa-1,13-tridecanedioic,

HOOC(CH₂)₃OCH₂CH₂CH₂CH₂(CH₂)₃COOH 6-oxa-1,13-tridecanedioic,

HOOC(CH₂)₃CH₂OCH₂CH₂CH₂(CH₂)₃COOH oxydicaproic,

HOOC(CH₂)₃CH₂CH₂OCH₂CH₂(CH₂)₃COOH 5,8-dioxa-1,13-tridecanedioic,

HOOC(CH₂)₃OCH₂CH₂OCH₂(CH₂)₃COOH 5,9-dioxa-1,13-tridecanedioic,

HOOC(CH₂)₃OCH₂CH₂CH₂O(CH₂)₃COOH and 3,6,9-trioxa-1,11-undecanedioic,

HOOCCH₂OCH₂CH₂OCH₂CH₂OCH₂COOH

The aliphatic and aromatic acids in both the copolyester and the final melt blend should be present within composition limits as follows: In the copolyester, the aromatic acid component, based on the total acid content, should be from 30–50% by weight with 35–45% by weight preferred. When melt-blending, the quantity of aromatic polyester should be so chosen that at least 10% by weight of the aromatic acid is added with respect to the total acid content. Thus, this gives an ultimate composition which contains an aromatic acid portion of total acid from 40–60% by weight, with 45–55% by weight being the preferred limits. Thus, within these critical limits, a considerable variation of aliphatic versus aromatic acid can be utilized. With respect to the copolyester, it is a simple matter to obtain the desired composition limits in the final copolyester, since all that is necessary is to start with the acid reactants in the proper quantitative relationship. Then, since the total acid content is known, one merely has to choose the amount of aromatic polyester to be melt-blended so that the composition limits described above can be met.

It should be realized, of course, that many combinations of the aliphatic and aromatic acids may be used. Thus, two or more aliphatic and/or two or more aromatic acids may be used to form the copolyester. Also a different aromatic acid than present in the copolyester or two or more aromatic acids may be used to form the aromatic polyester used for melt-blending. However, to insure the desired high stick temperatures, it is preferred to have the same aromatic acid common to both the copolyester and the aromatic polyester.

The copolyester and the aromatic polyester are each prepared individually by a melt polymerization process which while now conventional procedure, was first described in Carothers patents, U. S. 2,071,250 and 2,071,251. Of course, useful polymers may be prepared by solution polymerization, but this procedure is more difficult to use. In general, the melt polymerization process consists in preparing the copolyesters and polyesters by the action of a glycol on a dibasic acid, or one of its ester-forming derivatives. For either the copolyester or the aromatic polyester, a representative procedure may comprise heating together at 170° C.–225° C. in the molten state at atmospheric pressure the dimethyl esters of the acids involved, together with an excess (preferably 2.4 moles for each mole of dimethyl ester) of 1 or more polymethylene glycols in the presence of an ester interchange catalyst such as described in U. S. 2,465,319. After the ester interchange is complete, as indicated by the cessation of the evolution of methanol, the pressure is gradually reduced to the vicinity of 0.5 millimeter of mercury, while the temperature is increased to a range of 240–280° C. These conditions are maintained for about 4–5 hours with stirring, at which time a polymer of the desired intrinsic viscosity is obtained. For optimum results, the blend of copolyester and the aromatic polyester should have an intrinsic viscosity of the order of 0.7–1.5 or above. However, the polymer may have an intrinsic viscosity as low as 0.5, the determining factor being that the copolymer has a high enough intrinsic viscosity that the final melt blend has a value of intrinsic viscosity of at least 0.7. Of course, depending upon the particular reactants involved, the polymerization step (reduced pressure stage) may be longer or shorter and at a somewhat different temperature. The degree of efficiency of the catalyst involved may also change the timing of the cycle considerably.

When the term intrinsic viscosity is mentioned, it is used as a measure of the degree of polymerization of the particular polymer involved and defined as:

$$\text{limit } \frac{\ln \eta_r}{C} \text{ as } C \text{ approaches } 0$$

in which $\eta_r$ is the viscosity of a dilute solution of the polymer in a 60:40 mixture of phenol and tetrachlorethane divided by the viscosity of the solvent in the same units and at the same temperature, and C is the concentration in grams of the polymer per 100 cc. of solution.

The copolyester and the aromatic polyester should, of course, be prepared separately. As soon as the polymerization of each is complete they may be immediately blended until homogeneous and then spun or, if this is not convenient each polymer may be extruded separately upon a water-cooled wheel and then broken up into small chips. Then, as needed, each polymer in the form of chips may be fed to a separate melting chamber, from which it is pumped to a suitable blending apparatus where the two polymers are intimately mixed to a homogeneous mixture. After blending has been achieved (ordinarily 10–30 minutes), the molten mass may be extruded through suitable orifices to form shaped articles. If the blending is allowed to proceed for too long a period of time, excessive ester interchange takes place and the composition approaches a true copolymer which has lower stick temperature than the desired blend of this invention. On the other hand, a small amount of ester interchange is desirable so that the blend is a homogeneous mass, and not a heterogeneous mixture. Preferably, the blender operates on a continuous basis, so that all of the extruded polymers have the same thermal history. If at any time it is not convenient to extrude the blend immediately after homogeneity has been obtained, the blend should be cast upon a water-cooled wheel until it is solidified and then remelted as desired.

To further assure that an optimum of ester interchange takes place during the melt-blending operation, an inhibitor or stabilizer may be added to each component, at the end of the polymerization cycle, to tie up any free hydroxy groups that may be present in the polymeric chain. Inhibitors or stabilizers useful in the process of this invention are preferably the aryl esters of high molecular weight, monobasic acids, such as phenyl stearate, or of phosphorous acids, e. g. triphenyl phosphite, etc.

The temperature of the spinning or casting operation will vary, depending upon the spinning viscosity of the individual polymer, that temperature being used at which the polymer has a viscosity suitable for spinning under the conditions used. Generally speaking, this will be in the range of 225–275° C. Melt spinning is preferred, although solvent spinning may be used if desired.

The yarns of this invention in the undrawn state tend to remain tacky for a long period of time due to the uncrystallized character of the polymer and of the yarn when it is first made. The yarn crystallizes after the passage of time and becomes non-tacky. The crystallization is rapidly induced, however, by imparting a considerable degree of draw to the yarn after it has been extruded from the spinneret. Thus, if a yarn of this invention is drawn three times its length by passing it through drawing rollers, it is already set up to an essentially non-tacky state. Elastic yarns may be obtained even if a high degree of draw is imparted to the yarns during their spinning. The degree of spinning draw however, changes considerably the elongation of the yarn as spun. On the other hand, heat treatment alone, at a temperature about 10° C. or more below the stick temperature of the composition will accelerate crystallization and render the extruded articles non-tacky. Undrawn films prepared from the polymer blends of this invention and heat-treated in this manner have many uses.

It is preferred to relax the yarn as it passes beyond the drawing roller to a considerable extent in order to obtain a balance of the desired properties. After the yarn is drawn three times or more its length at the drawing roller, it may advantageously be wound up at a lower tension, for example at an over-all winding rate of 2.5 times the spinning speed. The reason for this lies in the fact that with a greater degree of draw, elongation at break decreases, tenacity and elastic recovery increase, and the amount of force required to extend the yarn a given percentage (modulus of elasticity) also increases. Thus, drawing, relaxing and winding conditions are preferably so chosen as to obtain optimum relationship of yarn properties for a particular use.

In general, it is preferred that after orientation of the yarn and relaxation, the packaged yarn be allowed to age for 12–48 hours before use or testing. This aging procedure may be speeded up if desired by heating. This aging time appears to allow equilibrium with respect to crystallization to occur and allows production of a more uniform product.

Since elastic yarns of this invention are more suitable for textile purposes after undergoing a drawing operation, it is obvious that elastic films prepared from these polyesters will also be more useful when drawn to the desired extent, so that orientation and crystallization result. Since films are two-dimensional rather than uni-dimensional as in the case of fibers and filaments, a different drawing process is in order. One method is to extrude the film from a slot orifice and then draw the film longitudinally by means of a pinch roll system while, at the same time, drawing laterally by means of clamps which are fastened at both edges of the film and move apart as the film is drawn longitudinally by the action of a pinch roll in a manner similar to that observed in finishing fabrics on a tenter frame. This film, during the two-dimensional drawing, may be heated by passing it over hot rolls during drawing or by means of hot inert gases, liquids or by induction heating. While it is preferred that two-dimensional orientation of the film takes place in two directions at the same time, this is not essential. The film, for example, may be drawn between two sets of rolls, first in one direction and then in another.

The tendency of the yarn or film to shrink under the influence of heat (e. g. at ironing temperatures) may be reduced to practical limits, i. e. 5–10% by a heat-setting operation which can be carried out before or after conversion to a finished article. The heat-setting operation comprises heating the yarn, film or fabric to an elevated temperature (100–150° C.) either in the presence or absence of a plasticizing agent for 15–45 minutes. A particularly useful method is to heat the material in the presence of steam at 110° C. for 30 minutes. It may be desirable to conduct the heat-setting treatment in two stages. This operation consists of an annealing period of a few minutes at 60°–80° C., followed by a longer heat-setting period at a temperature about 10° C. below the stick temperature.

The following examples of certain preferred embodiments further illustrate the principles and practice of this invention. Parts are by weight unless otherwise indicated.

Example I

To 200 parts of dimethyl terephathalate and 375 parts of dimethyl sebacate is added 425 parts of ethylene glycol. These are heated together at 170° C. to 220° C. at atmospheric pressure in the presence of 0.05 part each of litharge and zinc borate until the ester interchange is completed, as indicated by the cessation of the ebullition of methanol. Heating is continued; as the excess glycol is driven off and the system is gradually placed under vacuum, the temperature is raised to the vicinity of 275° C. The pressure on the system is reduced to 0.5 mm. Hg and the melt-condensation continues with the evolution of glycol for a period of 5 hours. All the while, the mixture is stirred vigorously. This copolyester has an intrinsic viscosity of 1.30.

The aromatic polyester is made by heating together at 170° C. to 220° C. 1000 parts of dimethyl terephthalate and 800 parts of ethylene glycol with 0.10 part each of litharge and zinc borate until the ester interchange is complete. The reactants are then heated with stirring, at 275° C. under a vacuum of 0.2 mm. Hg for 5 hours. This polymer has an intrinsic viscosity of 0.85.

Each polymer is then extruded as described above and broken up into chips. The polyethylene terephthalate and the polyethylene terephthalate/sebacate (35/65) chips are then fed into separate melting pots and thence are proportionally metered through pumps to the blending chamber at 275° C. The relative pump speeds are so adjusted that terephthalic acid will constitute 50% by weight of the acid content of the final polymer as spun. The molten materials pass through the blending chamber in about 20 minutes, during which time they become intimately mixed. The blend is drawn off by a conventional spinning pump and is extruded through a 15-hole spinneret into a cooling chamber where the filaments solidify. To prevent adherence of the individual filaments, micronized talc is applied prior to winding the yarn onto a suitable package.

The yarn is then drawn 4X (four times its original length) across a plate heated to 40° C. followed by relaxation of 200% at 30° C. to a net draw of 2X. The yarn is next heat-set in steam (110° C.) for ½ hour while it is on the final package. This yarn then exhibits the properties as listed below. For comparison, the properties of both cut and covered rubber are given.

|  | Yarn from polymer blend | Rubber | |
|---|---|---|---|
|  |  | Cut | Covered |
| Zero strength [1] | 185° C | 180° C |  |
| Ironing temperature [2] | 170° C | 150° C+ | Degrad. |
| Tenacity (Gpd.) at 100%/min. elong. | 0.75 | 0.12 | 0.62 |
| Elongation (percent) at break | 300 | 700 | 299 |
| Elastic recovery (percent) in 1 min. from 100% extension. | 98.8 | 99.8 | 99.0 |
| Shrinkage (percent) in 5 min. at 95° C. | 5.4 |  |  |
| Light durability | Fair | Very poor | Fair |
| Dyeability | Good | Very poor | Good |

[1] Temperature at which a fiber, just taut, breaks on contact with the heated surface. A minimum of 24 hours' aging is required.
[2] Temperature at which a bundle of filaments, under no tension, in contact with a heated surface, break or fuse together.

*Example II*

Using the procedure of Example I, 200 parts of dimethyl suberate and 200 parts of dimethyl terephthalate are added to 380 parts of trimethylene glycol. The only change in the procedure is that the vacuum or polymerization cycle is carried out for 6 hours at 270° C. The copolyester which has an intrinsic viscosity of 1.40 is then formed into chips. An aromatic polyester is then made using dimethyl terephthalate and ethylene glycol exactly as described in Example I. The polymers are then melted and melt-blended in the manner described previously and proportioned such that terephthalic acid constitutes 60% by weight of the acid content of the final polymer as spun. The polymer is extruded, formed into filaments and then drawn, followed by relaxation, so that a net draw of 2.5X is realized. This yarn exhibits the properties as shown below:

| Sticking temperature | Elongation | Tenacity | Elastic recovery |
|---|---|---|---|
|  | Percent | G. P. D. | Percent |
| Blend 160° C | 300 | 0.7 | 92 |
| Copolymer (corresponding to blend) 100° C |  |  |  |

*Example III*

To 125 parts of dimethyl terephthalate (corresponding to 38.5 per cent by weight of the acids present), 50 parts of dimethyl suberate, 75 parts of dimethyl azelate, and 75 parts of dimethyl sebacate are added 300 parts of ethylene glycol and 0.04 part each of litharge and zinc borate. After heating together at 170° to 225° C. to complete the ester interchange, the pressure is reduced to 0.5 mm. and the temperature increased to 275° C. After 4 hours under the latter condition, the stirring characteristics of the polymer mass indicate an intrinsic viscosity of about 1.40 whereupon 100 parts of polyethylene terephthalate, prepared as in Example I and thoroughly dried at 175° C. are added. After standing 30 minutes to allow the contents to reach about 270° C., the stirring is resumed for 15 minutes. The polymer blend now having a total terephthalic acid content of 55 per cent of the acids present is then allowed to cool and is broken into chips. Since the polymer is already blended to the desired degree, it is spun directly in simple extrusion apparatus followed by drawing and relaxing to a net draw of 2.5X. The yarn exhibits the following properties:

| Zero strength temperature | Elongation | Tenacity | Elastic recovery |
|---|---|---|---|
|  | Percent | G. P. D. | Percent |
| Blend 180° C | 275 | 0.65 | 96.0 |
| Copolymer (corresponding to blend) 110° C |  |  |  |

*Example IV*

Using the procedure of Example I, 200 parts of the dimethyl ester of 5,8-dioxa-1,12-dodecanedioic acid are melt polymerized with 200 parts of dimethyl terephthalate and 380 parts of ethylene glycol. The polymerization cycle is 5 hours at 275° C. and the intrinsic viscosity is 1.00. The aromatic polyester is then prepared from the dimethyl ester of terephthalic acid, as described in Example I. The two polymers are then melted and blended so that the final composition contains 60% by weight of the aromatic acid component based on total acid. This is then spun, etc. as described previously and, after drawing and relaxation to a net draw of 2.5X, exhibits properties as follows:

| Zero strength temperature | Elongation | Tenacity | Elastic recovery |
|---|---|---|---|
|  | Percent | G. P. D. | Percent |
| Blend 160° C | 200 | 0.6 | 91 |
| Copolymer (corresponding to blend) 115° C |  |  |  |

Example V

Following the procedure of Example I, 200 parts of dimethyl terephthalate and 300 parts of the dimethyl ester of oxydivaleric acid and 380 parts of ethylene glycol are melt polymerized. The polymerization cycle is carried out at 270° C. for a period of 6 hours. This polymer has an intrinsic viscosity of 1.25. An aromatic polyester is prepared, as described in Example I, from dimethyl terephthalate and ethylene glycol. The two polymers are then melt-blended for a period of 10 minutes to give an aromatic acid content of 55% and spun, followed by drawing and relaxing, to give a net draw of 2.5X. This yarn has properties as follows:

| Zero strength temperature | Elongation | Tenacity | Elastic recovery |
|---|---|---|---|
| | Percent | G. P. D. | Percent |
| Blend 160° C | 250 | .6 | 91 |
| Copolymer (corresponding to blend) 100° C | | | |

Example VI

To 200 parts of the dimethyl ester of tetramethylene bis p-oxybenzoic acid and 400 parts of the dimethyl ester of sebacic acid are added 430 parts of ethylene glycol. They are melt polymerized by the conventional procedure using a polymerization cycle of 6 hours at 275° C., to give a copolyester having an intrinsic viscosity of 1.35. An aromatic polyester is then prepared using the quantities and procedures of Example I, substituting the dimethyl ester of tetramethylene bis p-benzoic acid for dimethyl terephthalate. This polyester has an intrinsic viscosity of 1.00. After blending for 15 minutes, the final material contains 45% by weight based on total acid of aromatic acid. The yarn, after spinning and drawing to a draw ratio of 2.5X, has the properties:

| Zero strength temperature | Elongation | Tenacity | Elastic recovery |
|---|---|---|---|
| | Percent | G. P. D. | Percent |
| Blend 175° C | 300 | 0.5 | 93 |
| Copolymer (corresponding to blend) 95° C | | | |

The elastic polymer yarns of this invention are characterized by higher strength and higher stretch modulus than any rubber threads known. For the purpose of explanation, stretch modulus measures the force required to elongate the yarn a given percentage. A garment made of yarns having high tenacity and high stretch modulus will not only be durable but will also exert substantial pressure upon the body of the wearer after the garment is stretched into position. Yarns of this invention as compared with rubber threads may be spun readily into mutifilament yarns. They may be spun in the lower deniers, have a very low inherent color, may be dyed by common dyestuffs, need no plasticizers or other foreign ingredients such as might later be leached out of the yarn and have a high resistance to degradation by oxidation, exposure to light, soap, perspiration or greases and many other common chemicals. Furthermore, these elastic yarns have that property of rubber which is so lacking in other more or less quasielastic yarns made from synthetic, linear polymers; i. e., they are capable of very quick elastic recovery ("snap"). When the stress is relieved, the elastic structures of this invention very quickly resume their original shape. Therefore, it is apparent that a yarn or film of this type which has high extensibility and elastic recovery could be made useful in the fabrication of many articles, such as brassières, girdles, surgical hosiery, men's braces, bathing suits, stocking tops, suspenders, garters, pajamas, panties, knit shorts, woven shorts, anklets, sweaters, jackets, ski togs, dresses, blouses, skirts, caps and hats, gloves, tapes, ribbons, laces, belting, shoe fabrics, slip covers, upholstery, window drapes, pile fabrics, e. g. carpets and light velvets, elastic bandages, knee and ankle braces, hair nets, covers for jars, dishes, etc., bags, ropes and balls.

A brief discussion of a few of these uses will serve to make obvious the special advantages of these copolyester elastic yarns. Resistance to perspiration is especially important for garters and elastic underwear of all types. Insensitivity to warm water, to alkaline soaps and to the leaching of detergents is important in all clothing items, upholstery and other washable fabrics. Resistance to oils, greases, ointments, etc. is of importance in the field of elastic bandages, knee and ankle braces, etc. The ability to spin in low denier yarns consisting of many fine filaments as opposed to the spinning of a solid elastic core and covering with yarn is of utility in all fields where softness and suppleness are desirable. In the fields of body control garments, finer fabrics are always in demand, a paramount desire of the industry being to obtain girdles of lesser weight and bulk and surgical hosiery of greater sheerness. Copolyesters of the type disclosed and claimed herein are of special advantage in the fields just mentioned, since their capacity to be spun in fine deniers and to be used without protective covering along with their higher strength and elastic modulus per unit cross-section made it possible to construct fabrics and garments having functional processes similar or superior to those already available yet with substantially lower attendant weight and bulk.

The yarns of this invention may be used for the manufacture of two-way stretch, woven and knitted articles. They may also be used as either warp or weft threads in one-way stretch fabrics. One form of this latter type of fabric to which the yarns in the present invention are particularly adapted is that in which the warp threads are composed of some other textile material and in which the weft threads are partly a material having low elongation and partly the elastic material of the present invention. In making this type of garment, the elastic yarns in the weft may be elongated to a certain percentage as they pass across the loom with the other textile material. The fabric, after the release of strain, loses width after the elastic yarns are permitted to exercise their elastic recovery, the non-elastic weft yarns also retracting part of their length together with the elastic yarns.

While the invention has been described in terms of an elastic yarn, it will be understood that the characteristics that make the yarn elastic are inherent in the polymer and the polymer can find uses other than in yarn. Among these may be mentioned adherent elastic coatings for glassine paper and the like, fabric coatings, conformable elastic films, heat-shrinkable closures for bottles and the like, safety glass interlayers, oil-resisting gaskets, flexible tubing and coatings for wire.

An additional advantage of the elastic polymers of this invention is their heat stability at ironing temperatures. This is very important if the elastic yarns or films are to be used in garments that are customarily ironed or pressed.

As many widely different embodiments may be made without departing from the spirit and scope of this invention, it is to be understood that said invention is in no wise restricted save as set forth in the appended claims.

I claim:

1. A process for the production of a composition of matter having an intrinsic viscosity of at least about 0.5 which comprises blending a melt of a highly polymeric linear copolyester of at least one polymethylene glycol ester of an acyclic dicarboxylic acid of the formula

wherein X is a linear chain composed of 4 to 9 atoms, in the chain of which not more than three may be oxygen atoms and the remaining are hydrocarbon carbon atoms, any two such oxygen atoms being separated by at least two such carbon atoms, the hydrocarbon atoms being saturated and containing a total of not more than three hydrocarbon carbon atoms as side chain substituents, with at least one polymethylene glycol ester of a symmetrical aromatic dibasic acid from the group consisting of terephthalic acid, bibenzoic acid, ethylene bis-p-oxybenzoic acid, tetramethylene bis-p-oxybenzoic acid, and 2,6-naphthalic acid, the polymethylene glycol having from 2 to 6 carbon atoms, from 30% to 50% by weight of the acid components of the copolyester being aromatic acid, with a melt of a linear aromatic polyester of a polymethylene glycol and at least one symmetrical aromatic dibasic acid from the group consisting of terephthalic acid, bibenzoic acid, ethylene bis-p-oxybenzoic acid, tetramethylene bis-p-oxybenzoic acid, and 2,6-naphthalic acid, the polymethylene glycol having from 2 to 6 carbon atoms, from 40% to 60% by weight of the acid components of the blend being aromatic acid, at least 10% of which aromatic acid content is due to said linear polyester incorporated by blending, said blending in the melt state being carried out for a period of time sufficient only to produce a homogeneous blend.

2. A process for the production of a composition of matter having an intrinsic viscosity of at least about 0.5 which comprises blending a melt of highly polymeric linear copolyester of at least one ethylene glycol ester of an acyclic dicarboxylic acid of the formula

wherein X is a linear chain composed of 4 to 9 atoms, in the chain of which not more than three may be oxygen atoms and the remaining are hydrocarbon carbon atoms, any two such oxygen atoms being separated by at least two such carbon atoms, the hydrocarbon atoms being saturated and containing a total of not more than three hydrocarbon carbon atoms as side chain substituents, with at least one ethylene glycol ester of a symmetrical aromatic dibasic acid from the group consisting of terephthalic acid, bibenzoic acid, ethylene bis-p-oxybenzoic acid tetramethylene bis-p-oxybenzoic acid and 2,6-naphthalic acid, from 30% to 50% by weight of the acid components of the copolyester being aromatic acid, with a melt of a linear polyester of the same ethylene glycol ester of a symmetrical aromatic dibasic acid, from 45% to 55% by weight of the acid components of the blend being aromatic acid, at least 10% of which aromatic acid content is due to said linear polyester incorporated by blending, said blending in the melt state being carried out for from 10 to 30 minutes.

3. The process of claim 2 wherein the copolyester comprises a mixture of acyclic dicarboxylic acid esters of ethylene glycol, and the aromatic acid ester is the ethylene glycol ester of terephthalic acid.

4. The process of claim 2 wherein the copolyester comprises a single acyclic dicarboxylic acid ester of ethylene glycol, and the aromatic acid ester is the ethylene glycol ester of terephthalic acid.

5. The process of claim 4 wherein the copolymer comprises the ethylene glycol ester of sebacic acid.

6. A new composition of matter having an intrinsic viscosity of at least about 0.5, consisting essentially of the linear copolyester which results from the melt copolymerization of at least one acyclic dicarboxylic acid of the formula:

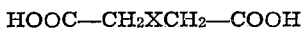

wherein X is a linear chain composed of 4 to 9 atoms, in the chain of which not more than three may be oxygen atoms and the remaining are hydrocarbon carbon atoms, any two such oxygen atoms being separated by at least two such carbon atoms, the hydrocarbon atoms being saturated and containing a total of not more than three hydrocarbon carbon atoms as side chain constituents, with at least one symmetrical aromatic dibasic acid from the group consisting of terephthalic acid, bibenzoic acid, ethylene bis p-oxy-benzoic acid, tetramethylene bis p-oxy-benzoic and 2,6-naphthalic acid, from 30% to 50% by weight of the aforesaid acid components of the copolyester being aromatic and an excess of a polymethylene glycol having from two to six carbon atoms, said copolyester being blended with a linear aromatic polyester of a polymethylene glycol and at least one symmetrical aromatic dibasic acid from the group consisting of terephthalic acid, bibenzoic acid, ethylene bis p-oxy-benzoic acid, tetramethylene bis p-oxy-benzoic acid and 2,6-naphthalic acid, the polymethylene glycol having from two to six carbon atoms, from 40% to 60% by weight of the aforesaid acid components of the blend being aromatic acid, at least 10% of which aforesaid aromatic acid content is due to said linear polyester incorporated by blending.

7. A new composition of matter having an intrinsic viscosity of at least about 0.5, consisting essentially of the linear copolyester which results from the melt copolymerization of at least one acyclic dicarboxylic acid of the formula:

wherein X is a linear chain composed of 4 to 9 atoms, in the chain of which not more than three may be oxygen atoms and the remaining are hydrocarbon carbon atoms, any two such oxygen atoms being separated by at least two such carbon atoms, the hydrocarbon atoms being saturated and containing a total of not more than three hydrocarbon carbon atoms as side chain constituents, with at least one symmetrical aromatic dibasic acid from the group consisting of terephthalic acid, bibenzoic acid, ethylene bis p-oxy-benzoic acid, tetramethylene bis p-oxy-benzoic and 2,6-naphthalic acid, from 30% to 50% by weight of the aforesaid acid components of the copolyester being aromatic and an excess of a polymethylene gylcol having from two to six carbon atoms, said copolyester being blended with a linear polyester of a polymethylene glycol ester of the same aforesaid symmetrical aromatic dibasic acid, from 40% to 60% by weight of the aforesaid acid components of the blend being aromatic acid, at least 10% of which aforesaid aromatic acid content is due to said linear polyester incorporated by blending.

8. The product of claim 7, wherein the reactants forming the copolyester are terephthalic acid, sebacic acid and ethylene glycol and the linear polyester of the aromatic dibasic acid is formed from terephthalic acid and ethylene glycol.

9. The product of claim 7, wherein the reactants forming the copolyester are terephthalic acid, suberic acid and trimethylene glycol and the linear polyester of the aromatic dibasic acid is formed from terephthalic acid and ethylene glycol.

10. The product of claim 7, wherein the reactants forming the copolyester are terephthalic acid, suberic acid, azeleic acid, sebacic acid and ethylene glycol and the linear polyester of the aromatic dibasic acid is formed from terephthalic acid and ethylene glycol.

11. The product of claim 7, wherein the reactants forming the copolyester are terephthalic acid, 5,8-dioxa-1,12-dodecandioic acid and ethylene glycol and the linear polyester of the aromatic dibasic acid is formed from terephthalic acid and ethylene glycol.

12. The product of claim 7, wherein the reactants forming the copolyester are terephthalic acid, oxydivaleric acid and ethylene glycol and the linear polyester of the aromatic dibasic acid is formed from terephthalic acid and ethylene glycol.

MARK DAGENKOLB SNYDER.

REFERENCES CITED

The following references are of record in the file of this patent:

UNITED STATES PATENTS

| Number | Name | Date |
|---|---|---|
| 2,224,037 | Brubaker et al. | Dec. 3, 1940 |
| 2,437,046 | Rothrock et al. | Mar. 2, 1948 |
| 2,460,186 | Moffett | Jan. 25, 1949 |
| 2,465,319 | Whinfield et al. | Mar. 22, 1949 |

FOREIGN PATENTS

| Number | Country | Date |
|---|---|---|
| 610,140 | Great Britain | Oct. 12, 1948 |